(12) United States Patent
Barbier et al.

(10) Patent No.: US 8,854,612 B2
(45) Date of Patent: Oct. 7, 2014

(54) OPTICAL SYSTEM FOR MEASURING ORIENTATION WITH CUBIC WEDGE AND MASK

(75) Inventors: Bruno Barbier, Bordeaux (FR); Laurent Potin, Coutras (FR); Siegfried Rouzes, Le Haillan (FR)

(73) Assignee: Thales, Neuilly sur Seine (FR)

( * ) Notice: Subject to any disclaimer, the term of this patent is extended or adjusted under 35 U.S.C. 154(b) by 117 days.

(21) Appl. No.: 13/566,963

(22) Filed: Aug. 3, 2012

(65) Prior Publication Data

US 2013/0057852 A1 Mar. 7, 2013

(30) Foreign Application Priority Data

Aug. 5, 2011 (FR) ...................................... 11 02462

(51) Int. Cl.
*G01B 11/26* (2006.01)
*G01B 11/03* (2006.01)
*G01B 11/00* (2006.01)

(52) U.S. Cl.
CPC ............... *G01B 11/03* (2013.01); *G01B 11/00* (2013.01); *G01B 11/26* (2013.01)
USPC .................................................... 356/139.03

(58) Field of Classification Search
CPC .......... G01B 11/26; G01B 11/00; G01B 9/02; G01B 11/002; G01B 9/02027; G01B 9/02018; G01B 2290/70
See application file for complete search history.

(56) References Cited

U.S. PATENT DOCUMENTS 6,486,955 B1 * 11/2002 Nishi ............................ 356/401

FOREIGN PATENT DOCUMENTS

JP 2007 521462 8/2007

OTHER PUBLICATIONS

French Search Report for Counterpart French Patent Application No. 1102462, 7 pgs. (Feb. 15, 2012).

* cited by examiner

*Primary Examiner* — Luke Ratcliffe
(74) *Attorney, Agent, or Firm* — Blakely, Sokoloff, Taylor & Zafman LLP

(57) ABSTRACT

The field of the invention is that of optical systems for detecting the posture of a mobile object in space. The system comprises an electro-optical fixed device of known orientation comprising a first point emission source, a telecentric emission/reception optic and a photosensitive matrix sensor. An assembly comprising an optical cubic wedge is disposed on the mobile object. The input face of the cubic wedge comprises a mask in the shape of a parallelogram, each side of the parallelogram comprising a geometric marking making it possible to identify it, the image of the mask projected on the photosensitive matrix sensor, by reflection on the faces of the cubic wedge, being the intersection of the projection of the mask and of the projection of its image inverted with respect to the centeR of the cubic wedge. Analysis of this image makes it possible to determine the orientation of the cubic wedge.

9 Claims, 4 Drawing Sheets

OPTICAL SYSTEM FOR MEASURING ORIENTATION WITH CUBIC WEDGE AND MASK

BACKGROUND OF THE INVENTION

1. Field of the Invention

The field of the invention is that of optical devices making it possible to measure the orientation of an object in space without contact. Diverse possible fields of application exist, but the main application is the detection of aircraft pilot helmet posture, thus making it possible to project in his visor an image superimposed exactly on the exterior landscape or to slave various systems of the craft to his gaze. The precision sought in such systems is of the order of a milliradian.

2. Description of the Prior Art

Various optical techniques making it possible to undertake on-helmet orientation measurement exist. Generally, spottable elements are installed on the helmet and are pinpointed by a system of cameras. The position of the images of these spottable elements makes it possible to determine the orientation of the helmet by calculation.

These elements may be passive or active. Passive elements are illuminated by an external source. To this end, retroreflecting cubic wedges may be used, which make it possible to reduce the problems of stray light, due to solar illumination. It suffices to dispose the optical emission and reception members on the same axis.

The active elements are generally light-emitting diodes. The cameras have a fixed fine-tuning distance and consequently a necessarily limited depth of field.

This technique presents a certain number of drawbacks. The quality of the image of each point imaged on the detector depends on the position of the helmet and its orientation, thus limiting the precision of the system if it is desired to cover a significant measurement volume or an appreciable range of rotation.

SUMMARY OF THE INVENTION

The system according to the invention remedies these two drawbacks. It essentially comprises, mounted on a fixed framework of known orientation, a single optical device of telecentric type for emitting and receiving parallel light beams. The beams emitted emanate from a point source; the beams received originate from the retroreflection of the light coming from the source by a retroreflector mounted on the mobile object whose orientation it is sought to determine. The retroreflector comprises a mask of particular shape. The analysis of the image of the mask of the reflector by a matrix detector disposed in the optical device makes it possible to retrieve the orientation of the retroreflector and consequently of the mobile object.

It may be demonstrated that, with this detection system, the quality of the measurement is, by construction, independent of the position of the helmet and of its orientation. Furthermore, its other advantages are as follows:

A very simple algorithm for determining orientation;
A possible adaptation of the direction of illumination to the position of the helmet;
A great insensitivity to solar illumination;
The use of entirely passive helmet-mounted devices requiring neither linking cable, nor electrical power supply cable.

More precisely, the subject of the invention is a system for detecting the posture of a mobile object in space comprising an electro-optical fixed device of known position and orientation comprising at least one first point emission source and a photosensitive matrix sensor; and an assembly comprising an optical cubic wedge disposed on the mobile object, characterized in that:

the electro-optical fixed device comprises a telecentric optic essentially comprising a projection objective, a reception objective and a semi-reflecting optical element which are arranged in such a way that the first point emission source is disposed at the focus of the projection objective by reflection or by transmission through the semi-reflecting optical element and that the image of the first point emission source is disposed at the focus of the reception objective by transmission or by reflection through the semi-reflecting optical element;

the input face of the cubic wedge comprises a mask in the shape of a parallelogram, each side of the parallelogram comprising a geometric marking making it possible to identify it, the image of the mask on the photosensitive matrix sensor, by reflection on the faces of the cubic wedge, being the intersection of the projection of the mask and of the projection of its image by the cubic wedge with respect to the centre of the cubic wedge.

Advantageously, the markings are simple geometric shapes of small dimension with respect to the dimensions of the sides and situated in the vicinity of the ends of each side.

Advantageously, the geometric shapes form lugs and/or notches.

Advantageously, the first point emission source or its image is disposed on the optical axis common to the projection objective and to the reception objective.

Advantageously, the fixed device comprises a matrix of point emission sources, the said sources being turned on as a function of the position of the mobile object.

The invention also relates to a first pilot helmet, characterized in that it comprises an optical cubic wedge whose input face comprises a mask in the shape of a parallelogram, each side of the parallelogram comprising a geometric marking making it possible to identify it, the said cubic wedge being intended to operate in a system for detecting the posture of a mobile object as described hereinabove.

The invention also relates to a second pilot helmet, characterized in that it comprises an electro-optical fixed device of known orientation with respect to the helmet, the said device comprising at least one first point emission source, a telecentric optic and a photosensitive matrix sensor, the said device being intended to operate in a system for detecting the posture of a mobile object as described hereinabove.

Finally, the invention relates to a weapon system comprising sighting means, characterized in that the said means comprise an optical cubic wedge whose input face comprises a mask in the shape of a parallelogram, each side of the parallelogram comprising a geometric marking making it possible to identify it, the said cubic wedge being intended to operate in a system for detecting the posture of a mobile object as previously described. The weapon system may be a firearm carried by an infantryman.

BRIEF DESCRIPTION OF THE DRAWINGS

The invention will be better understood and other advantages will become apparent on reading the description which follows given without limitation and by virtue of the appended figures among which.

DETAILED DESCRIPTION

Figure 1:
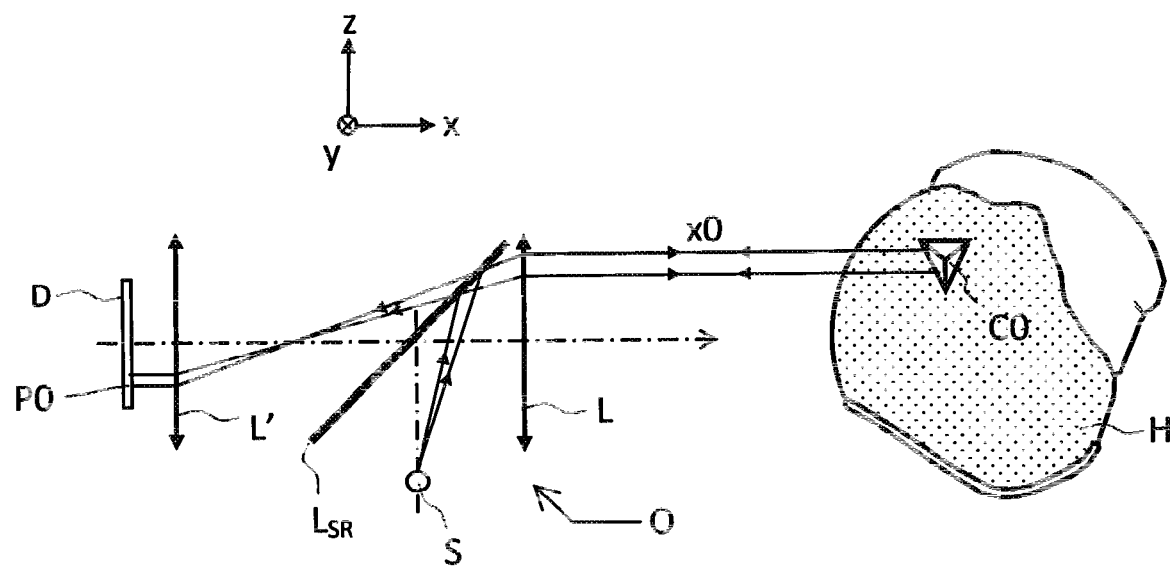
FIG. 1 represents a general view of the posture detection system according to the invention.

By way of first exemplary embodiment, FIG. 1 represents a first embodiment of the detection system according to the invention in the simplest case, that is to say comprising a single point source S and within the context of detection of the orientation of a pilot helmet H. This first configuration can be adapted very easily to other applications.

The system essentially comprises two sub-assemblies, an electro-optical fixed device Ot and a helmet whose orientation it is sought to determine. It is referenced in a coordinate frame (O, x, y, z).

The electro-optical fixed device Ot is situated in the cockpit of an aircraft and occupies a known position and orientation with respect to the frame of reference of the aircraft.

The electro-optical device Ot comprises a point-like light source S. This source may be a light-emitting diode or a laser diode.

It also comprises a telecentric optical system comprising a projection objective L, a reception objective L' and a semi-reflecting optical element $L_{SR}$. The projection objective L like the reception objective L' may consist either of simple lenses or of groups of lenses. The semi-reflecting optical element $L_{SR}$ may be either a simple plane plate treated as represented in the various figures or a splitter cube. The assembly of the projection and reception objectives constitutes an afocal system, that is to say their focus is common.

The image of the source S is disposed at the focus of the projection objective L by reflection on the semi-reflecting optical element $L_{SR}$. Consequently, the image of S is collimated at infinity by the objective L which thus emits a parallel light beam in a direction x0 as indicated in FIG. 1. It is equally possible to use the semi-reflecting optical element $L_{SR}$ in reflection on the emission pathway and in transmission on the reception pathway or vice versa.

The helmet H is equipped with a single retro-reflector of cubic wedge type C0. A diaphragm or mask, of known shape and position with respect to the cubic wedge, is fixed on the input face of the cubic wedge. The collimated return flux emanating from the cubic wedge retroreflector C0 is, whatever its position or its orientation, projected at P0 parallel to x0 onto the vertical detector De in a bird's eye projection through the afocal objective consisting of the optics L and L'. On the basis of the shape of the image gathered on the detector, a simple calculation provides the instantaneous orientation of the helmet.

Figure 2:
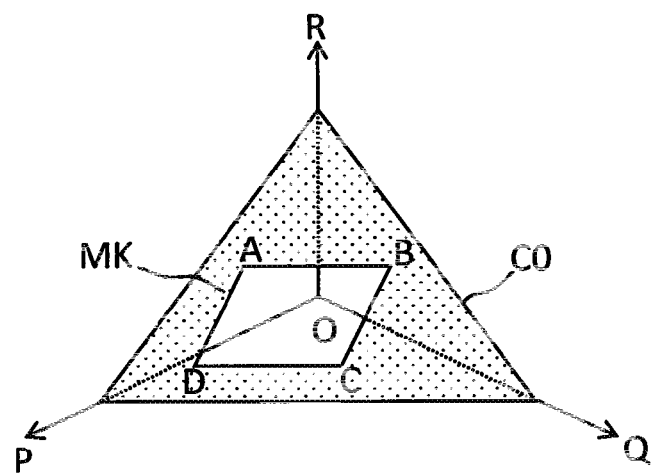
FIG. 2 represents a view of a cubic wedge according to the invention with its mask.

The principle of orientation measurement on the basis of the device of FIG. 1 is described hereinbelow. The cubic wedge C0 is represented in FIG. 2 in an orthogonal coordinate frame (O, P, Q, R). The three orthogonal reflecting faces are denoted POQ, POR and ROQ. In front of the vertex O is positioned a transparent mask MK in the shape of a parallelogram, the positions of whose vertices A, B, C and D with respect to the vertex O are known.

Figure 3:
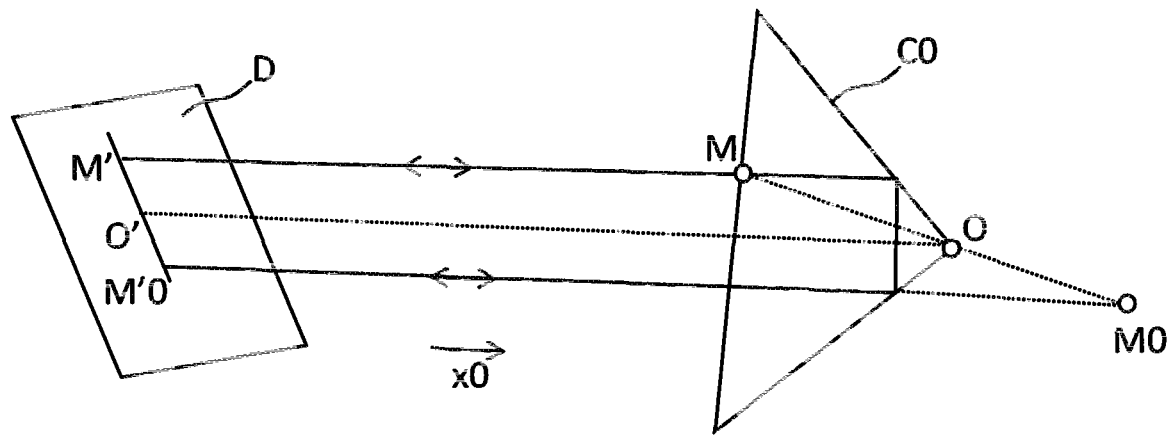
FIG. 3 represents the formation of the image M0 of an object point M through the cubic wedge and of their images M' and M'0 projected onto the detector.

FIG. 3 represents the image, given by the cubic wedge C0, on the detector D of a point M of the mask. When a parallel light beam is shone onto the cubic wedge C0, each point M of the contour of the mask and its image M0 through the reflector are, in principle, symmetric with respect to the vertex O of the reflector.

Since the bird's eye projection preserves symmetry, the projected images M' and M'0 of the points M and M0 on the detector D are symmetric with respect to the projection O' of O. In the same manner, the mask ABCD and its image A0B0C0D0 through the reflector C0 are symmetric with respect to O. Since the symmetry preserves parallelism, A0B0C0D0 is a parallelogram.

Since the bird's eye projection preserves parallelism, the image projected on the detector of the mask ABCD is a parallelogram A'B'C'D'; the projected image of the image A0B0C0D0 is also a parallelogram A'0B'0C'0D'0. Since the bird's eye projection preserves symmetry, the projected parallelogram A'B'C'D' is symmetric with respect to O' of the projected parallelogram A'0B'0C'0D'0 as seen in FIG. 4.

The real luminous image actually obtained on the detector D is the area common to the two areas A'B'C'D' and A'0B'0C'0D'0. For a direction of the axis x0 inside the angle of vertex O and of base ABCD, this area has the points A', S, A'0 and T as contour as seen in FIG. 4 where this area is represented by bold lines. It corresponds to the luminous flux incident in the direction x0, filtered by the diaphragm ABCD, then reflected by the reflector of vertex O, filtered by the contour A0B0C0D0, symmetric with the contour ABCD and finally projected onto the detector D parallel to x0.

This luminous area gathered on the detector has as contour a parallelogram A'-S-A'0-T which is centred on O', the meeting point of the diagonals, and which consists in the general case of one of the vertices of the projection A'B'C'D' of the mask ABCD and of a fraction of each of the sides A'B' and A'D' of the projection of the mask ABCD.

Figure 4:
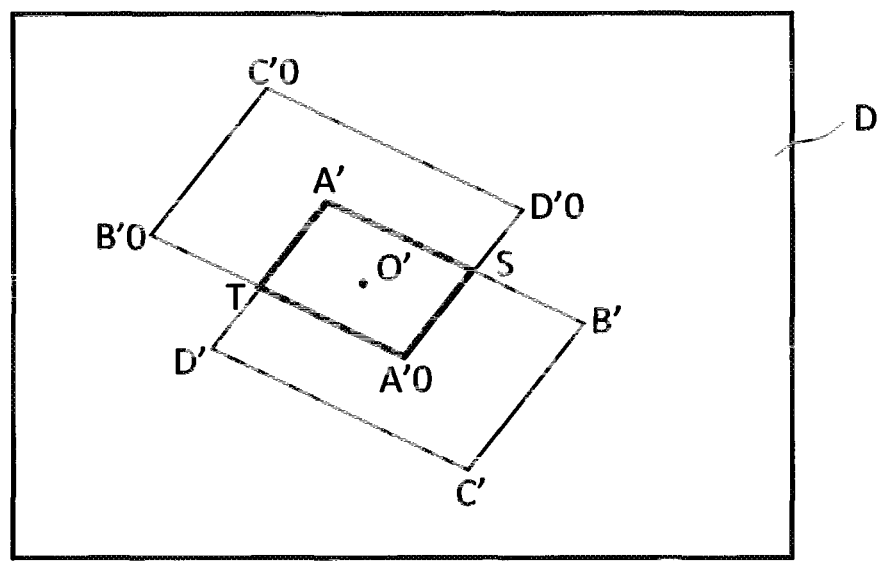
FIG. 4 represents: the geometric construction of the image of a mask by reflection on the faces of the cubic wedge.
Figure 5:
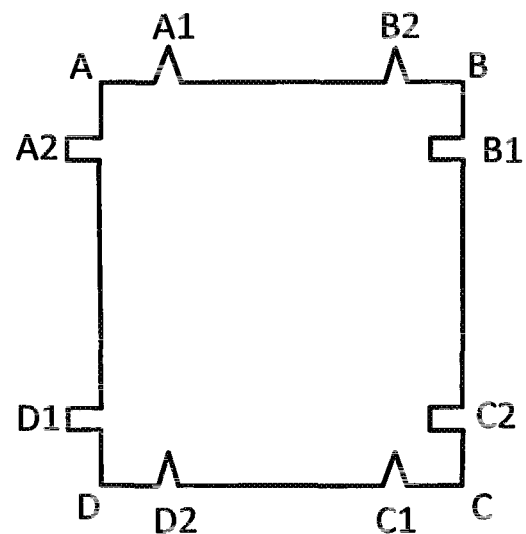
FIG. 5 represents an example of a marking system for the mask.

If the mask of the cubic wedge is a simple parallelogram as indicated in FIGS. 2 and 4, it is impossible to discriminate in the image A'-S-A'0-T the vertices and sides of the mask as seen in FIG. 4. Hence, as indicated in FIG. 5, a specific marking is added at the end of each side of the mask to differentiate the sides and therefore the vertices of the mask. This marking is a shape coding.

By way of nonlimiting example, the coding of FIG. 5 is:
coding of the side AB: notches A1 and B2 outwards from the contour of triangular shape;
coding of the side BC: lugs B1 and C2 inwards from the contour of rectangular shape;
coding of the side CD: lugs C1 and D2 of triangular shape;
coding of the side DA: notches D1 and A2 of rectangular shape.

It is understood that, while remaining within the context of this invention, an infinity of possible codings exists.

This marking allows, on the projected image,
mutual differentiation of the four sides of the diaphragm, so as to identify the projected vertex;
differentiation between the vertices of the parallelogram A'B'C'D' characterized by a marking on the sides of the vertex, in proximity to the vertices and one of the "new" vertices S or T characterized by an absence of marking in proximity to the vertices.

Figure 6:
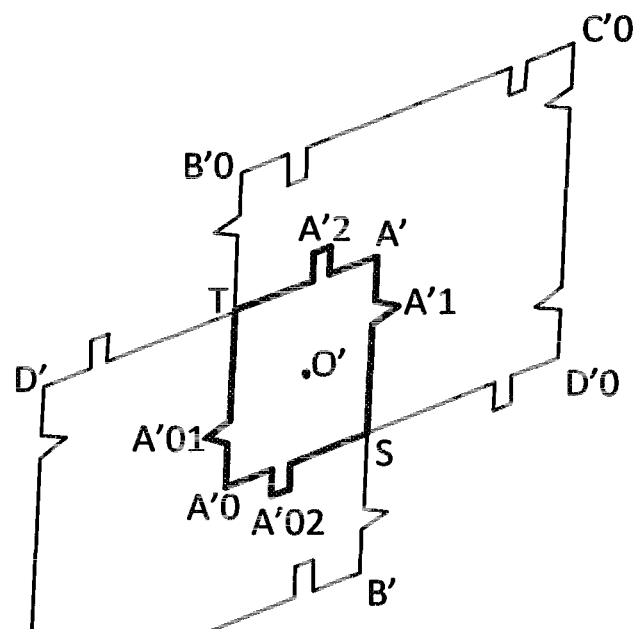
FIG. 6 represents the geometric construction of the image of a mask marked by reflection on the faces of the cubic wedge.

The four elements utilized on the luminous parallelogram imaged on the detector are, in the example of FIG. 6:
the positions of the centre O' and of the vertex A' that are pinpointed by virtue of the lug A'1 and A'2,
the directions of one of the straight lines bearing the sides A'S and A'T.

In this FIG. 6, the common area is represented by bold lines as in FIG. 4.

It seems that there is still a last ambiguity to be resolved. It relates to a side and its image through the reflector. As seen in FIG. 6, there is no differentiation on the image projected between the vertex A' of the parallelogram A'B'C'D' and its homologue A'0 of the symmetric quadrilateral A'0B'0C'0D'0. In fact, there is none. Indeed, in the great majority of applications, the angular swings are limited, on the one hand by the limits of the angular acceptance of the reflector maximum rotation in each direction, about the y and z axes of the fixed coordinate frame, always less than 90 degrees and on the other hand by the operational limits of the orientation of the reflector which are the maximum rotations in each direction, about the x axis of the fixed coordinate frame, always less than 90 degrees. Thus, the point A is always "on the left" of B, the point D is always "on the left" of C, the points A and B are always "above" C and D.

It is possible for the two projected parallelograms to have fractions of sides in common. In this case, the vertex used for the analysis may be either A', or B'.

Analysis of the image produced on D then makes it possible to determine the orientation of the retro-reflector C0. This image analysis provides, in the coordinate frame of the detector, the following three elements:

the positions of the projections of two known points of the reflector:
  the vertex O of the cubic wedge;
  one of the four vertices of the contour of the mask;
the orientation of the projection of a known direction of the reflector, namely one of the sides of the contour passing through the previous vertex.

The orientation of two directions of the cubic wedge and therefore of the helmet are obtained with the aid of these three elements.

The parallelogram general shape of the mask is preferable. Other simple geometric shapes would be possible such as quadrilaterals or triangles, but they may lead under certain orientation conditions either to complex shapes of images such as hexagons, or to shapes of images in which no vertex is the projection of a vertex of the mask.

As seen in FIG. 1, if a point source disposed on the optical axis is used, the measurement is possible only in the collimation beam given by the lens L. To illuminate more significant measurement zones without using optics of overly large dimension, it is necessary to displace the source of the optical axis so as to obtain off-axis collimated beams. The orientation of illumination is then modified to permit significant lateral displacements of the mobile object. Various opto-mechanical means exist for ensuring this displacement.

Figure 7:
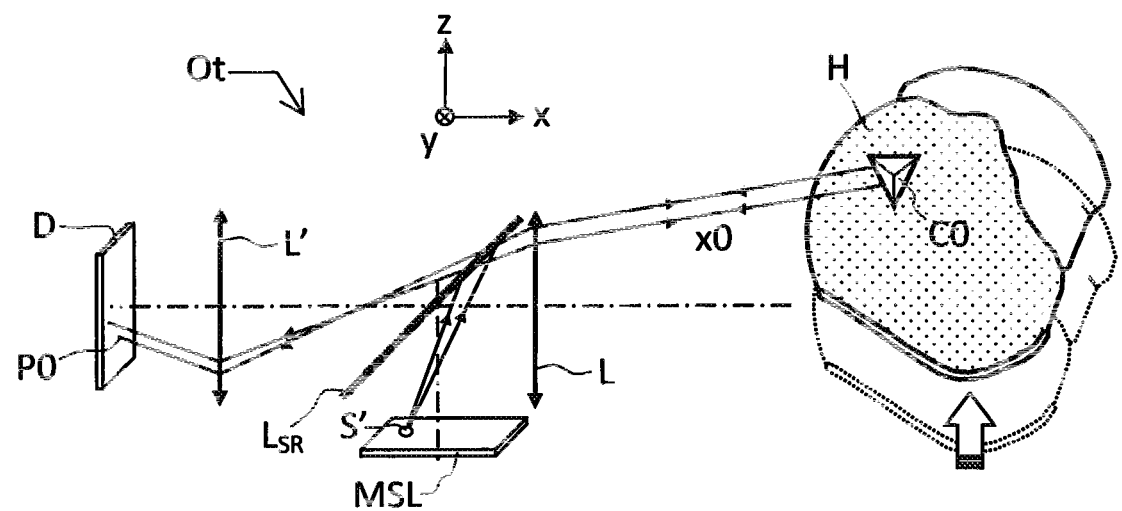
FIG. 7 represents a system according to the invention with matrix of luminous sources.

A simpler way is represented in FIG. 7. The source S is replaced by a matrix MSL of luminous sources S' positioned on the image by the LSR semi-reflecting plate in the focal plane of the lens L.

A single source S' is turned on on the matrix M. When the image P0 arrives at the edge of the detector, configuration that can be pinpointed by a simple image processing, the source S' is turned off and another source S' of the matrix is turned on so as to recentre the image of the cubic wedge on the detector D.

The advantages of the system according to the invention are as follows. The cubic wedge fixed on the mobile object and serving for detection is lightweight, compact, passive since it does not comprise any electrical link, is insensitive to solar illumination, and is insensitive to metallic masses. The optical emission-reception device is simple both in the opto-mechanical design and in the digital processing of the images of the cubic wedge.

The assembly makes it possible to precisely determine the orientation of a mobile object independently of its position. In the previous examples, the mobile object is a pilot helmet and the fixed device is positioned in an aircraft cabin. It is of course possible to fix the cubic wedge on an operator, for example on his head or on his hand.

It is also possible to use the system in the guise of remote sighting system. It operates in the following manner. A weapons system has its sighting line equipped with a cubic wedge according to the invention. It is thus possible to ascertain the orientation of the sighting line by means of an emission-reception device. A fixed camera films a scene at infinity. This scene is reproduced on a monitor. The orientation of a direction of the weapons system is symbolized by a mobile reticle inlaid into the image on the monitor. An operator can thus precisely control the orientation of his weapons system with respect to a target in the scene without having to sight. Consequently, the alignment of his eye, of the target and of the mobile object is no longer necessary; it suffices to control in the image the superposition of the target and of the reticle. The position of the operator is no longer a constraint.

In another variant, the illuminating and picture-capturing device is carried by the helmet of an infantryman. The helmet is equipped with an imager presenting at infinity a mobile reticle superimposed on the real scene at infinity; the infantryman's weapon is equipped with the reflector; its precise orientation with respect to the helmet is symbolized by the position of the mobile reticle displayed in the helmet's imager. The infantryman thus carries out sighting remotely in his helmet. The previous advantages are obtained again. The alignment of the eye of the infantryman, of the target and of the weapon is no longer necessary; the alignment of the eye of the infantryman, of the target and of the reticle is sufficient; the position of the weapon with respect to the head is no longer a constraint.

It is also possible to use the system according to the invention as a lightweight, a magnetic and precise measurement toolkit to carry out fast mapping of electromagnetic helmet position detection; fast mapping toolkit. Moreover, the fixed part of the toolkit comprising the illumination source and the camera part can be sited remotely, away from the piloting cabin.

What is claimed is:

1. A system for detecting posture of a mobile object in space comprising:
  an electro-optical fixed device of known orientation comprising at least one first point emission source and a photosensitive matrix sensor; and
  an assembly comprising an optical cubic wedge disposed on the mobile object, wherein:
    the electro-optical fixed device comprises a telecentric optic comprising a projection objective, a reception objective and a semi-reflecting optical element which are arranged in such a way that the at least one first point emission source is disposed at a focus of the projection objective by reflection or by transmission through the semi-reflecting optical element and that an image of the at least one first point emission source is disposed at a focus of the reception objective by transmission or by reflection through the semi-reflecting optical element;
    an input face of the optical cubic wedge comprises a mask in a shape of a parallelogram, each side of the parallelogram comprising a geometric marking making it possible to identify each side, an image of the mask on the photosensitive matrix sensor, by reflection on the input face of the optical cubic wedge, being an intersection of a projection of the mask and of a projection of it's the image of the mask by the optical cubic wedge with respect to a centre of the optical cubic wedge.

2. The system for detecting the posture of the mobile object according to claim 1, wherein markings of the parallelogram are simple geometric shapes of small dimension with respect to dimensions of corresponding sides of the parallelogram and situated in a vicinity of ends of each side.

3. The system for detecting the posture of the mobile object according to claim 2, wherein the simple geometric shapes form lugs and/or notches.

4. The system for detecting the posture of the mobile object according to claim 1, wherein the at least one first point emission source or its image is disposed on an optical axis common to the projection objective and to the reception objective.

5. The system for detecting the posture of the mobile object according to claim 1, wherein the fixed device comprises a matrix of point emission sources, the said sources being turned on as a function of a position of the mobile object.

6. The system for detecting the posture of the mobile object according to claim 1, wherein the mobile object is a pilot helmet.

7. The system for detecting the posture of the mobile object according to claim 1, wherein the electro-optical fixed device is mounted at a known position and a known orientation on a pilot helmet.

8. The system for detecting the posture of the mobile object according to claim 1, wherein the mobile object is a weapon system comprising sighting means.

9. The system for detecting the posture of the mobile object according to claim 8, wherein the weapon system is a firearm.

* * * * *